United States Patent [19]

Blackwell

[11] 4,355,059

[45] Oct. 19, 1982

[54] POLY(ARYLENE SULFIDE) COMPOSITION CONTAINING A POLYOLEFIN

[75] Inventor: Jennings P. Blackwell, Bartlesville, Okla.

[73] Assignee: Phillips Petroleum Company, Bartlesville, Okla.

[21] Appl. No.: 256,874

[22] Filed: Apr. 24, 1981

[51] Int. Cl.³ ............................................... B05D 3/02
[52] U.S. Cl. .............................. 427/388.2; 427/388.4; 427/389.7; 427/393.5; 427/393.6; 428/419; 525/189; 525/537
[58] Field of Search ..................... 525/189, 537; 427/388.2, 388.4, 389.7, 393.5, 397.6; 428/419

[56] References Cited

U.S. PATENT DOCUMENTS

| | | |
|---|---|---|
| T 952,005 | 10/1976 | Attwood et al. |
| 3,616,186 | 9/1969 | Blackwell ............................ 161/187 |
| 3,622,376 | 11/1971 | Tieszen et al. ................... 117/132 B |
| 3,634,125 | 1/1972 | Tieszen ................................. 117/49 |
| 3,652,327 | 3/1972 | Hill et al. ......................... 117/132 B |
| 3,736,301 | 5/1973 | Berenbaum ........................... 260/79 |
| 3,770,678 | 11/1973 | Paul ...................................... 260/28 |
| 3,799,454 | 3/1974 | Blackwell ............................. 241/16 |
| 3,801,379 | 4/1974 | Blackwell .......................... 148/6.27 |
| 3,856,560 | 12/1974 | Blackwell ........................ 117/132 B |
| 3,877,970 | 4/1975 | Edmonds et al. .................... 427/379 |
| 3,884,873 | 5/1975 | Short ............................. 260/45.85 B |
| 3,894,983 | 7/1975 | Higbee ................................. 260/37 |
| 3,925,530 | 12/1975 | Rees ................................... 264/297 |
| 3,953,653 | 4/1976 | Doss ................................... 428/419 |
| 4,000,347 | 12/1976 | Ranney ............................... 428/419 |
| 4,020,031 | 4/1977 | Merrill .......................... 260/29.2 R |
| 4,021,596 | 5/1977 | Bailey ................................. 428/375 |
| 4,025,582 | 5/1977 | Needham ........................... 260/897 |
| 4,060,570 | 11/1977 | Paul ................................... 260/889 |
| 4,064,084 | 12/1977 | Blackwell . |
| 4,132,823 | 1/1979 | Blackwell et al. ................. 428/215 |
| 4,134,874 | 1/1979 | Needham ........................ 260/375 B |
| 4,139,576 | 2/1979 | Yoshimura et al. ............... 260/857 |
| 4,145,326 | 3/1979 | Blackwell ....................... 260/26.9 F |
| 4,147,819 | 4/1979 | Hukumoto et al. ................ 427/195 |
| 4,157,273 | 6/1979 | Brady ................................. 156/315 |
| 4,212,923 | 7/1980 | Brady ................................. 428/419 |
| 4,214,021 | 7/1980 | Blackwell ...................... 427/385 R |
| 4,237,039 | 12/1980 | Blackwell ...................... 260/29.2 R |
| 4,247,598 | 1/1981 | Blackwell ........................... 428/419 |

Primary Examiner—Michael R. Lusignan
Attorney, Agent, or Firm—French, Hughes and Doescher

[57] ABSTRACT

Poly(arylene sulfide) coating compositions are described comprising a poly(arylene sulfide) and a polyolefin in an aqueous medium.

15 Claims, No Drawings

POLY(ARYLENE SULFIDE) COMPOSITION CONTAINING A POLYOLEFIN

BACKGROUND OF THE INVENTION

The invention relates to poly(arylene sulfide) coating compositions, to methods of applying such compositions to a substrate, and to articles coated with such compositions.

Arylene sulfide polymers are known for their high-temperature stability. These polymers can be applied to substrates in a variety of ways, one of which is to prepare an aqueous slurry of the polymer, apply the slurry to a substrate, remove the aqueous medium by evaporation, and then cure the polymer, thus providing a hard, heat-resistant surface for the substrate. It has been found that cured poly (arylene sulfide) coatings sometimes are not continuous, smooth surfaces on the substrate but contain pinholes and craters which make the surface nonuniform and cause the substrate to be exposed and subject to corrosion at the exposed points.

It is therefore an object of the present invention to provide a method of applying a smooth, continuous poly(arylene sulfide) coating.

It is a further object to provide aqueous poly(arylene sulfide) coating compositions which, after application and curing on a metal substrate, provide a smooth, continuous surface.

SUMMARY OF THE INVENTION

According to the invention, a poly(arylene sulfide) coating composition comprises a major amount of an arylene sulfide polymer and a minor amount of a polyolefin in an aqueous slurry. According to one aspect of the invention, the aqueous slurry of a poly(arylene sulfide) and a polyolefin is applied to a metal substrate, the aqueous medium is removed, and the poly(arylene sulfide) is curred to form a hard coating on the substrate.

DETAILED DESCRIPTION OF THE INVENTION

The nature of the arylene sulfide polymers for use in the invention is not critical so long as the polymer is fusible. The polymer is preferably a solid at 25° C. The polymer can be linear, branched or lightly crosslinked. Suitable arylene sulfide polymers can be produced, for example, by the methods of Edmonds et al in U.S. Pat. No. 3,354,129 and Campbell in U.S. Pat. No. 3,919,177. If desired, such polymers can be subjected to mild, partial curing or light crosslinking, as in the method of Rohlfing U.S. Pat. No. 3,717,620, prior to being used in the coating compositions of this invention. The polymers will generally have crystalline melting points ranging from about 200° to about 480° C. A presently preferred arylene sulfide polymer is poly(phenylene sulfide) (PPS) which has a crystalline melting point ranging from about 250°–300° C. Preferred arylene sulfide polymers have an inherent viscosity in 1-chloronaphthalene at 206° C. and a polymer concentration of 0.4 g/100 ml solution ranging from about 0.1 to 0.3.

The polyolefins suitable for use in the invention include normally solid homopolymers and copolymers of aliphatic 1-olefins containing from 2 to about 10 carbon atoms per molecule. It is within the scope of the invention to use copolymers of such aliphatic 1-olefins with a polar monomer; for example, copolymers of ethylene and/or propylene with an unsaturated acid or ester thereof, e.g. acrylic acid, methacrylic acid, ethyl acrylate, methyl methacrylate, acrylonitrile, styrene, vinyl acetate, vinyl chloride, and the like. Suitable methods of preparing such homopolymers and copolymers are well known in the art.

The presently preferred polyolefins for use in the invention are polyethylene and substantially crystalline polypropylene. The density of the polyethylene can range from about 0.91 to about 0.97 g/cc and the molecular weight (weight average) can vary from about 1500 to about 250,000. The polypropylene can have a density of about 0.88 to about 0.91 and a weight average molecular weight of about 2500 to about 250,000.

The aqueous medium in which the polymeric components of the slurry are dispersed can be water or a solution of water and a water-miscible solvent such as ethylene glycol, propylene glycol, glycerol, methyl alcohol, ethyl alcohol and isopropyl alcohol. The weight ratio of water to water-miscible solvent, when used, is not critical, but for reasons of economy it will generally be at least about 0.3:1, most commonly at least about 1:1.

The concentration of arylene sulfide polymer in the aqueous slurry can vary over a wide range. Generally, the arylene sulfide polymer will be present in the range of about 10 to about 60, preferably about 20 to about 40, weight percent based on the weight of the slurry.

The polyolefin is present in the slurry in an amount effective for promoting the formation of a smooth, continuous cured polyarylene sulfide coating. The amount of polyolefin can vary considerably depending upon the conditions under which it is to be applied, but generally the polyolefin will be present in an amount from about 0.1 to about 10 parts by weight based on 100 parts by weight of the arylene sulfide polymer (php), preferably about 1.5 to 3.5, most preferably about 2.5 php.

The poly(arylene sulfide), the polyolefin and any additives used may be combined in any manner effective for providing substantially even mixing of the constituents of the slurry. The use of a ball or rod mill, which enables particle size reduction and mixing, is generally preferred to combine the solid components of the slurry.

It may be desirable for some applications to include in the coating composition components in addition to the arylene sulfide polymer and the olefin polymer. For example, the coating composition can include other polymers such as poly(tetrafluoroethylene), surface active agents, and pigments and fillers such as titanium dioxide, ferric oxide, cobaltic oxide, zinc oxide, molybdenum disulfide, graphite, carbon black, calcium carbonate, and silica. When used, such additives are generally present in an amount of from about 1 to 25 parts by weight based on the weight of 100 parts by weight of the poly(arylene sulfide).

Substrates which can be coated with the invention composition include materials which can withstand the temperatures required for curing the coating, such as metals, glass, ceramics, stone and plastics. Generally, the substrate is a metal such as aluminum, chromium, iron and its alloys, or titanium. Preparation of the surface to be coated generally consists only of cleaning to remove any dirt, grease or scale present. The substrate can be in any form desired, including sheeting, wire, coupons, blanks and objects which have been molded or otherwise formed into specific shapes. The coating is useful for numerous industrial and commercial applications such as release coatings for molds, pipe coatings, and non-stick frypans.

The slurry can be applied to a substrate in any suitable manner, such as by spraying, brushing or dipping. After application of the slurry to the substrate, the aqueous medium is removed, usually by evaporation with applied heat. The coating is cured by heating at a temperature effective for curing the polyarylene sulfide polymer, generally within the range of about 260° C. to about 480° C., preferably about 320° C. to about 420° C., for about 5 minutes to 24 hours, generally about 8 minutes to 4 hours, in an oxygen-containing atmosphere such as air. If desired, the cured coating can be annealed by, for example, heating at a temperature within the range of about 110° C. to 270° C. for about 20 minutes to 12 hours. The final coating will generally have a thickness of at least 1 mil and can be as thick as 20 mils or more.

EXAMPLE

The poly(phenylene sulfide), PPS, was prepared as described in U.S. Pat. No. 3,354,129 by reacting a mixture comprising p-dichlorobenzene, sodium sulfide and N-methyl-2-pyrrolidone. The recovered purified and dried polymer was a V-1 type resin having an uncrosslinked virgin PPS melt flow of 2000 (ASTM-D-1238-70, Condition L). A stock slurry was prepared by overnight ball milling (about 14 hours) of 100 parts by weight of the PPS and 300 parts by weight of deionized water. To a 30 g portion of the stock slurry containing a calculated 10 g of PPS was added, in control run 1, 0.2 g calcium stearate powder (2 parts by weight calcium stearate per 100 parts by weight PPS). To another 30 g portion of the stock slurry was added, in the invention run, 0.25 g (2.5 parts by weight per 100 parts by weight PPS) of a high density polyethylene powder (0.96 g) cc density, Mw about 2,000 and particle size about 2 to 20 microns. A third 30 g portion of stock slurry was retained as a control in control run 2. The slurries containing the additives were thoroughly mixed to provide a uniform mixture. Aluminum coupons approximately 7.6×15×0.16 cm were degreased with acetone and then grit-blasted to obtain clean surfaces. A portion of a slurry was charged to a spray gun and a coupon was sprayed with the mixture. The spray gun was cleaned and charged with a portion of the second slurry and a second clean coupon was sprayed. The process was repeated using the third slurry and a third clean coupon. The coated coupons were dried and placed in an air-circulated oven maintained at about 700° F. (371° C.) for 30 minutes to cure the coatings. The samples were then removed from the oven and cooled in air at ambient conditions.

The cooled samples were visually inspected and rated as shown in Table I. The coating thickness averaged about 1-2 mils (0.02-0.05 mm).

TABLE I

| Run | Additive | Cured Coating Appearance |
| --- | --- | --- |
| 1 (control) | calcium stearate | smooth, glossy, many fine small craters |
| 2 (invention) | polyethylene | smooth, glossy, a few small craters |
| (control) | none | glossy, many craters and fisheyes (gel particles) |

The runs show that cured coatings containing a minor amount of polyethylene, the coating being initially applied as an aqueous slurry to the substrate, yield coatings having an enhanced appearance compared to coatings containing a known additive of PPS slurries and those having no additives.

I claim:

1. A coating composition comprising a major amount of a curable poly(arylene sulfide) and a minor amount of a polyolefin in an aqueous medium, the polyolefin being present in an amount effective to reduce surface defects in a cured coating of said coating composition.

2. The composition of claim 1 in which the polyolefin is present in an amount within the range of about 0.1 to about 10 parts by weight per 100 parts by weight poly(arylene sulfide).

3. The composition of claim 2 in which the polyolefin is selected from the group consisting of normally solid homopolymers and copolymers of aliphatic 1-olefins having from 2 to about 10 carbon atoms.

4. The composition of claim 3 in which the polyolefin is selected from the group consisting of polyethylene, polypropylene, and copolymers of ethylene and propylene.

5. The composition of claim 2 in which the poly(arylene sulfide) is present in an amount within the range of about 10 to about 60 weight percent, based on the weight of the composition.

6. The composition of claim 5 in which the poly(arylene sulfide) is poly(phenylene sulfide).

7. The composition of claim 6 in which the polyolefin is polyethylene.

8. The composition of claim 7 in which the polyethylene has a weight average molecular weight in the range of about 1500 to about 250,000 and a density in the range of about 0.91 to about 0.97 g/cc.

9. The composition of claim 7 in which the composition further comprises titanium dioxide in an amount within the range of about 1 to about 25 parts by weight per 100 parts by weight poly (phenylene sulfide).

10. The composition of claim 9 in which the polyethylene is present in an amount within the range of about 1.5 to about 3.5 parts by weight per 100 parts by weight poly (arylene sulfide).

11. A method for applying a smooth, continuous coating of a poly(arylene sulfide) to a substrate, the method comprising applying to the substrate a continuous layer of an aqueous slurry comprising a major amount of a curable poly(arylene sulfide) and a minor amount, effective to reduce surface defects in the cured coating, of a polyolefin dispersed in an aqueous medium, removing the aqueous medium, and curing the poly(arylene sulfide) on the substrate.

12. The method of claim 11 in which the polyolefin is present in the aqueous slurry in an amount within the range of about 0.1 to about 10 parts by weight per 100 parts by weight poly(arylene sulfide).

13. The method of claim 12 in which the polyolefin is selected from the group consisting of normally solid homopolymers and copolymers of aliphatic 1-olefins having from 2 to about 10 carbon atoms.

14. The method of claim 13 in which the polyolefin is selected from the group consisting of polyethylene, polypropylene, and copolymers of ethylene and propylene.

15. The method of claim 14 in which the polyarylene sulfide is cured by heating at a temperature in the range of about 260° C. to about 480° C. for at least about 5 minutes.

* * * * *